United States Patent [19]

Oudet

[11] 4,415,845

[45] Nov. 15, 1983

[54] ELECTRIC MOTOR CONTROL DEVICE

[75] Inventor: Claude Oudet, Besançon, France

[73] Assignee: Portescap, LaChaux de-Fonds, Switzerland

[21] Appl. No.: 305,626

[22] PCT Filed: Jan. 30, 1981

[86] PCT No.: PCT/CH81/00011

§ 371 Date: Sep. 21, 1981

§ 102(e) Date: Sep. 21, 1981

[87] PCT Pub. No.: WO81/02207

PCT Pub. Date: Aug. 6, 1981

[30] Foreign Application Priority Data

Jan. 30, 1980 [CH] Switzerland .......................... 732/80

[51] Int. Cl.³ .............................................. G05B 19/40

[52] U.S. Cl. .................................... 318/696; 318/685; 318/254; 368/156

[58] Field of Search ........................ 318/138, 254, 696; 368/155, 156, 159, 160

[56] References Cited

U.S. PATENT DOCUMENTS

| | | | |
|---|---|---|---|
| 4,136,308 | 1/1979 | King | 318/696 |
| 4,242,623 | 12/1980 | Oudet et al. | 318/696 |
| 4,250,435 | 2/1981 | Alley et al. | 318/138 |

*Primary Examiner*—J. V. Truhe

*Assistant Examiner*—Saul M. Bergmann

*Attorney, Agent, or Firm*—Cushman, Darby & Cushman

[57] ABSTRACT

This control device is used in connection with a motor comprising a magnetic rotor and at least two magnetic stator circuits coupled with respective coils ($b_1$,$b_2$). A logic circuit (21) is arranged to alternatively feed drive pulses to both coils and to connect the coil which is not fed to a detection circuit (24, 25) the output of which is connected to the logic circuit in order to determine the duration of a feed pulse or to trigger a new feed pulse. This control device allows the current consumption of the motor as well as the locking torque to be reduced, since the servo control obtained insures the rotor positioning in case an important disturbance should occur.

2 Claims, 7 Drawing Figures

ELECTRIC MOTOR CONTROL DEVICE

The present invention relates to an electric motor control device of the type comprising a magnetic rotor and at least two separate magnetic stator circuits, each coupled with at least one electric coil and disposed in such manner as to form between them an electric angle of $2K\pi\pm\pi/2$ (k=0, 1, 2). A known device of the type with which the invention is concerned comprises a source of electric energy, a pulse generator circuit controlled by a clock signal source for supplying rotor driving pulses to at least one of the coils of one of the magnetic stator circuits, and comprises an integrator circuit arranged for receiving the signals induced by the rotor in at least one of the coils of another of the said magnetic stator circuits for determining the duration of a driving pulse of the rotor.

In this known control device, one of the magnetic stator circuits is reserved during operation of the motor for the function of detecting the flux induced by the rotor and thus it does not contribute to the drive proper. This device is in addition designed for operating with continuous rotation in a given direction of movement.

The present invention has for its object to provide a control device permitting a motor of the aforementioned type to be caused to operate in two-phase manner and step-by-step in one or other direction of movement, while permitting a servo control of the position of the rotor and an automatic regulation of the duration of the driving pulses. The invention is more particularly concerned with providing a simple and efficient device which can be used particularly in the clock and watchmaking field.

To this end, the device according to the invention is characterised in that it comprises a logic control circuit connected, by its inputs, firstly to the source of clock signals and secondly to the output of the integrator circuit and, by its outputs, to the control inputs of a commutating circuit, the commutating circuit being connected to the electric energy source, to the different coils and to the input of the integrator circuit, the logic control circuit and the commutating circuit being arranged so as to be able to connect the coupled coils with each of the said magnetic stator circuits to the electric energy source or to the input of the said integrator circuit in such manner that the motor operates in two-phase manner and step by step under the effect of driving pulses supplied alternately to the coils associated with one and the other phase, at least one of the coils associated with the phase not supplied by a driving pulse being connected, at least temporarily, to the integrator circuit.

According to a preferred embodiment, the control device comprises a level detector associated with the integrator circuit, the logic circuit being arranged for interrupting a driving pulse and/or for triggering a new driving pulse as a function of the presence of an output signal from one of the level detectors and from the instant of the appearance of this signal with respect to the clock signals, and also for resetting the integrator to zero at the commencement and at the end of each provided integration period.

On the other hand, the logic circuit may be arranged for temporarily short-circuiting at least one coil, so as to damp the moving rotor in the vicinity of the position of equilibrium and/or to tend to hold it in this position by such a circuit.

The control device according to the invention not only makes possible a reduction in the energy consumption of the motor by limiting the duration of the electric driving pulses to the value necessary for a given load of the motor and by permitting the locking torque of the motor necessary for the stepwise operation to be reduced by construction, while assuring an improved functioning which is practically insensitive to external disturbances.

In effect, with the present control device, the position of the rotor is controlled by means of a servo-control loop comprising a detector of the flux induced by the rotor, an integrator of this flux associated with a level comparator, a logic circuit for treatment of the time-amplitude data and a driving coil of the rotor controlled from the logic circuit. Furthermore, this device does not involve any additional structural element in a two-phase motor.

These properties, as well as other features and properties of the control device according to the invention will become more clearly apparent from the description, given by way of example, of different embodiments of the invention, illustrated by the accompanying drawings.

Figure 1:
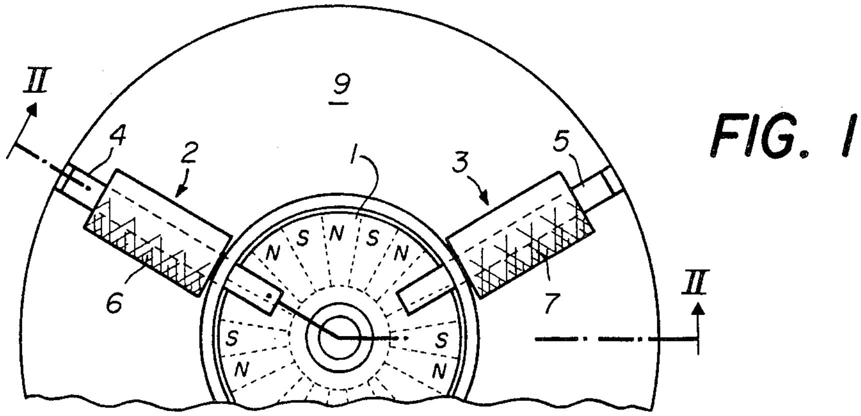
FIG. 1 is a plan view of a motor having a magnetic rotor, such that it may be used in connection with the control device according to the invention.
Figure 2:
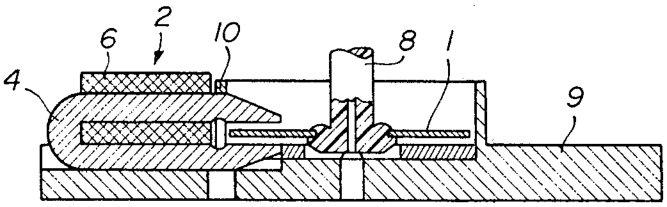
FIG. 2 is a sectional view of the motor of FIG. 1, along the broken line II—II.

The motor which is shown in FIGS. 1 and 2 comprises a rotor in the form of a disc 1, magnetised axially so as to present, on each of these surfaces, magnetic poles which are alternately positive and negative. The parts defined by dotted lines and designated by N and S represent the poles which appear on the upper surface of the multi-polar magnet, i.e., in the present example, N=10 pairs of poles. In addition, FIG. 1 shows two stator elements 2 and 3 forming separate magnetic stator circuits and each comprising a U-shaped part 4, 5 of highly permeable material, of which the free ends form the polar parts of the corresponding magnetic circuit. Coils 6,7 are wound on one of the legs of each U-shaped part and are connected to a control circuit which is not shown in FIGS. 1 and 2.

The shaft 8 of the rotor and the stator elements are fixed on a supporting part 9, the U-shaped parts being engaged in grooves in this plate and being held by an annular part 10 which is cast with the plate 9.

The stator elements as shown are arranged radially and disposed in such manner that the poles of the rotor pass between the pole-pieces of these elements. The angular distance between these elements is $\bar{\alpha}=117°$ and the corresponding electric angle $N\bar{a}=1170°=3\times360°+90°$.

The control device according to the invention supplies a motor of the type mentioned above, for example, such as that described in FIGS. 1 and 2, by supplying driving pulses alternately to the coils of the magnetic circuits associated with the two phases in accordance with a two-phase operating procedure. These two phases are hereinafter designated as phase 1 and phase 2 and the corresponding coils as $b_1$ and $b_2$ (6 and 7 in FIG. 1), it being understood that $b_1$ and $b_2$ can represent in a general manner several coils distributed on a corresponding or smaller number of magnetic stator circuits.

Figure 3:
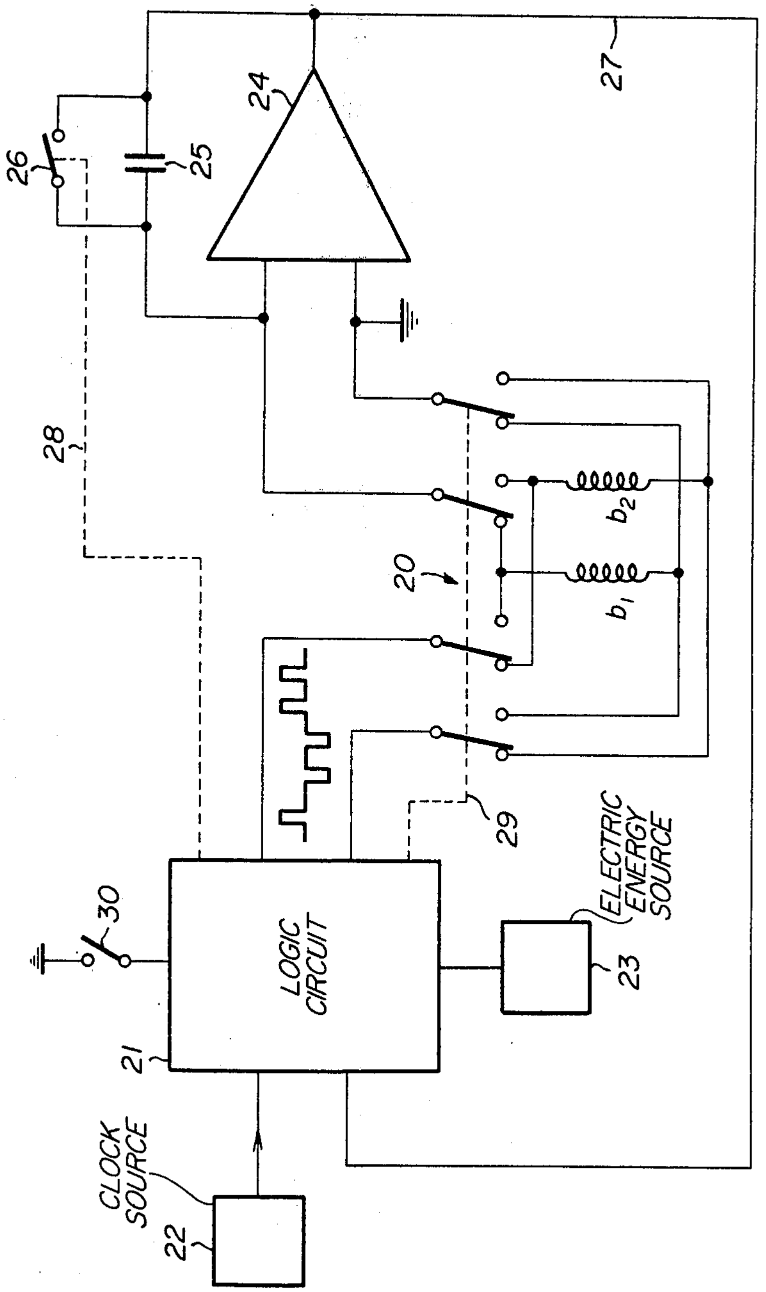
FIG. 3 is a diagram showing the principle of a control device according to the invention.

FIG. 3 shows diagrammatically, essentially in block form, the arrangement in principle of the control device according to the invention.

The coils $b_1$ and $b_2$ are connected by means of a switch 20, represented diagrammatically by contacts, firstly to output terminals of a circuit 21, hereafter called a logic circuit, and secondly to the inputs of an operational amplifier 24, of which the output is coupled to one of the inputs by means of a condenser 25. The switch 20 is controlled from the logic circuit 21, this control being represented diagrammatically by the dotted line 29, and the condenser 25 may be short-circuited, likewise under the control of the logic circuit 21, which is represented in FIG. 3 by a contact 26 and a dotted control line 28.

The circuit 21 is controlled, on the one hand, by clock signals provided by a source 22 and, on the other hand, by the output signals of the operational amplifier 24 appearing on a line 27 which indicates diagrammatically the connection between this circuit 24 and the circuit 21. This latter has, in addition, a control connection which is connected to a switch 30 permitting the direction of rotation of the motor to be determined by the sequence of the driving pulses defined by the logic circuit. An electric energy source is represented diagrammatically by a block 23 connected to the circuit 21. Secondary connections are not shown in the diagram of FIG. 3.

The operation of this device will be described by reference to FIG. 4, which shows the flux and torque variations relating to the two phases 1 and 2 of the motor in question, as a function of the angle of rotation $\alpha$ of the rotor. The starting position of the rotor has been indicated by $\alpha_o$ and corresponds to an extreme of the torque due to the current in the phase 1. Let $Cni_1$ be this torque produced by $ni_1$, ampere-turns assumed constant, resultants of a current $i_1$ applied to the coil $b_1$ by means of the circuit 21. In the corresponding position of the switch 20, the coil $b_2$ is connected to the inputs of the circuit 24,25 forming an integrator circuit.

Close to the point $\alpha_o$, the flux induced by the rotor in the core of the coil $b_2$ is at its maximum and it follows the curve $\Phi_{a2}$. The rotor advances and is stabilised at a point $\alpha_o+\pi/2N$, a position of equilibrium defined by the locking torque $C_{04}$ represented in FIG. 4. This locking torque is the static torque acting on the rotor in the absence of current and it has a frequency four times that of the torque due to the current, for example $Cni_1$. It is assumed that the current $i_1$ is cut off when the rotor reaches its position of equilibrium and that the integrator has been set at zero by the closure of the contact 26 and then again set in action. The flux $\Phi_{a2}$ is normally substantially zero. Any accidental variation of position $\Delta\alpha$ is shown by a variation $\Delta\Phi$ of the flux $\Phi_{a2}$ and thus by a signal appearing at the output of the integrator on the line 27. The logic circuit 21 comprises means for comparing the output signal of the integrator with a reference value and, if a position deviation $\Delta\alpha$ exceeding a predetermined value is thus detected, the circuit 21 causes a new application of the current in the phase 1 so as to cancel out $\Delta\alpha$. The new application of current has occurred during a limited time sufficient for permitting the cancellation of 66 $\alpha$, the integrator is reset at zero and is then once again made operational with the same consequences as previously. The rotor is thus compelled to remain in the vicinity of $\alpha_o+\pi/2N$, this position being also maintained by the locking torque of magnetic origin $C_{o4}$ and also, if necessary, by other known means.

For advancing a fresh step, the circuit 21 is connected to the coil $b_2$ and the coil $b_1$ is connected to the integrator 24,25. By applying $ni_2$ ampere-turns to the phase 2, the rotor is subjected to a torque $Cni_2$ and it advances again from $\pi/2N$ to arrive at $\alpha_o+\pi/N$. In this position, the phase 1 is used for detecting the flux $\Phi_{a1}$ induced by the rotor and before being substantially zero in the new position of equilibrium. Any deviation in the position of equilibrium of the rotor exceeding a certain value is shown as previously by a fresh application of current in the coil of the phase 2.

It is to be noted that if the previously considered positions of equilibrium are not exactly those expected, this does not have any effect on the starting torque, since $Cni_1$ and $Cni_2$ correspond, at the start of a step, to the extreme point of a sinusoid. It is thus unnecessary to aim for a high precision in construction in order to assure the viability of the system; it is sufficient for the positions of equilibrium to be approximately maintained, for example at $\pm\pi/6N$, which would correspond to a third of a step.

Obviously, the following steps are effected by alternately applying the currents corresponding to the phase 1 and the phase 2.

If the direction of rotation is reversed, the servo control operates in the same manner since reversal of the direction of rotation is obtained—after a step in the forward direction has been effected—by supplying once more the last supplied coil instead of the coil of the other phase. Operation is then continued by alternatively supplying both phases as in the forward direction.

The control device functioning in accordance with the previously described principle can also be used for creating an automatic limitation of the pulse duration, that is to say, a determination of the pulse duration as a function of the load of the motor. For the function which has just been described as regards its principle, the integrator was only used from the end of a pulse until the commencement of the following pulse. For determining the duration of the pulse, the integrator is used during the application of the current. For this purpose, a resetting to zero of the integrator is effected at the start of the application of the current, when the rotor is still not practically displaced. When the output level of the integrator, connected as previously to the non-supplied coil, reaches a predetermined value, corresponding to the flux variation expected at the end of a step or just before, it controls the stoppage of the current in the supplied phase, with or without delay. If an appreciable locking torque exists, obtained for example by a sufficiently large torque $C_{o4}$ or by a residual current, the delay is not necessary. On the contrary, if the locking torque is insufficient, the current is switched off with a delay permitting the rotor to be stopped in the stable position of equilibrium defined by the torque $Cni_1$ itself.

The operation is repeated in analogous manner for the supply of the second phase and the interruption of the current in the latter. The integrator is then once again available for the function of controlling a compensation of a disturbance of the equilibrium position. The integrator is also able to control, without delay, the triggering of a following driving pulse, so as to obtain a practically continuous rotation of the rotor.

Figure 5:
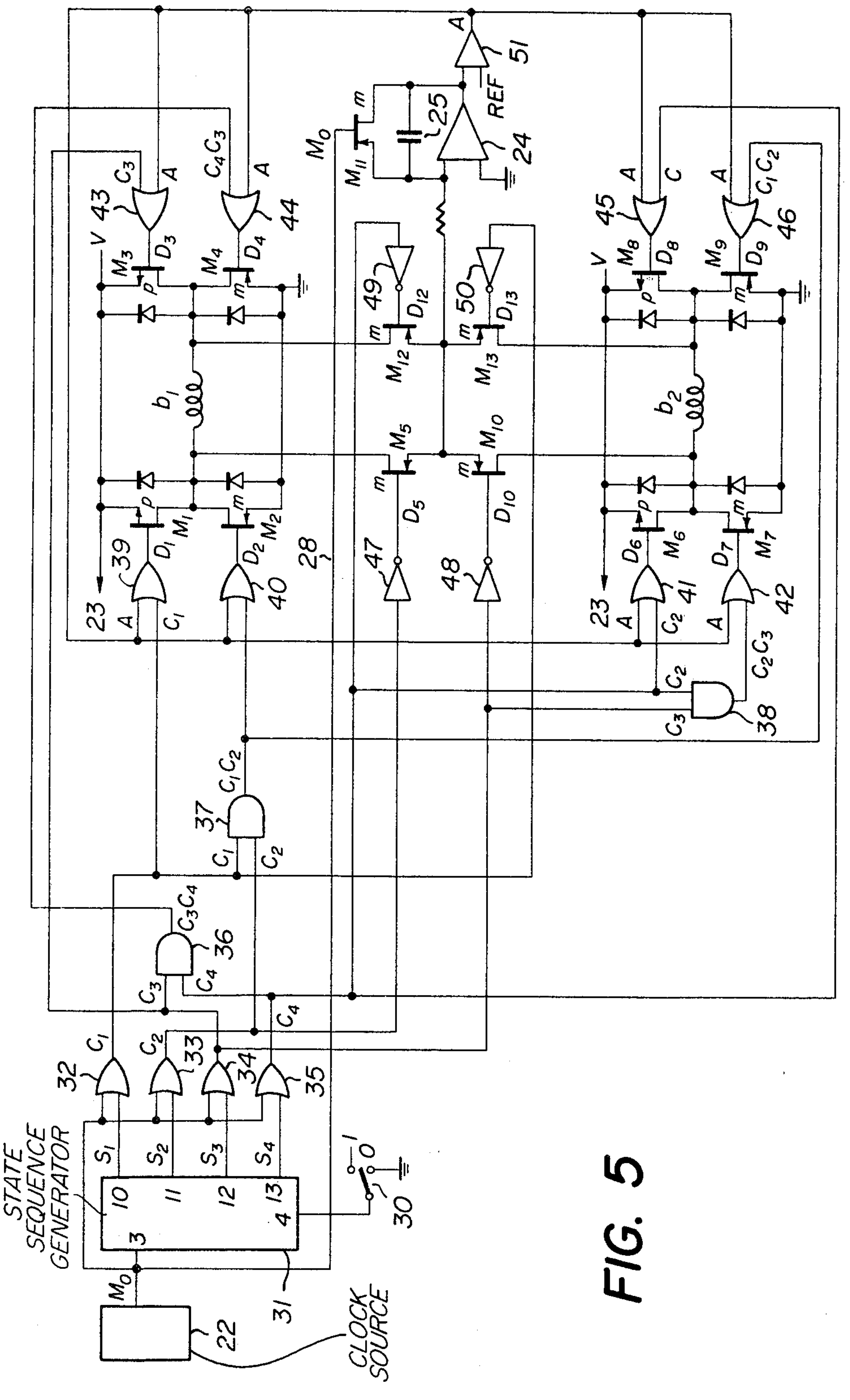
FIG. 5 is a detailed diagram of a control device according to the invention, which permits the limiting of the duration of the driving pulse and the damping of the rotor in the vicinity of its position of equilibrium.

FIG. 5 is a detailed diagram of a control arrangement in accordance with the general principle of FIG. 3, showing the practical embodiment of the commutation or switching circuit and of the logic circuit in a given case. More particularly, the arrangement of FIG. 5 makes possible the limitation of the duration of the driving pulses and the damping of the rotor in the vicinity of its position of equilibrium.

In FIG. 5, the elements analogous to those already shown in FIG. 3 have been indicated by the same reference numerals. The signals appearing at certain points of the circuit in FIG. 5 are represented as a function of time in FIG. 6 and the same reference symbols have been used in the two Figures for indicating these signals.

Figure 6:
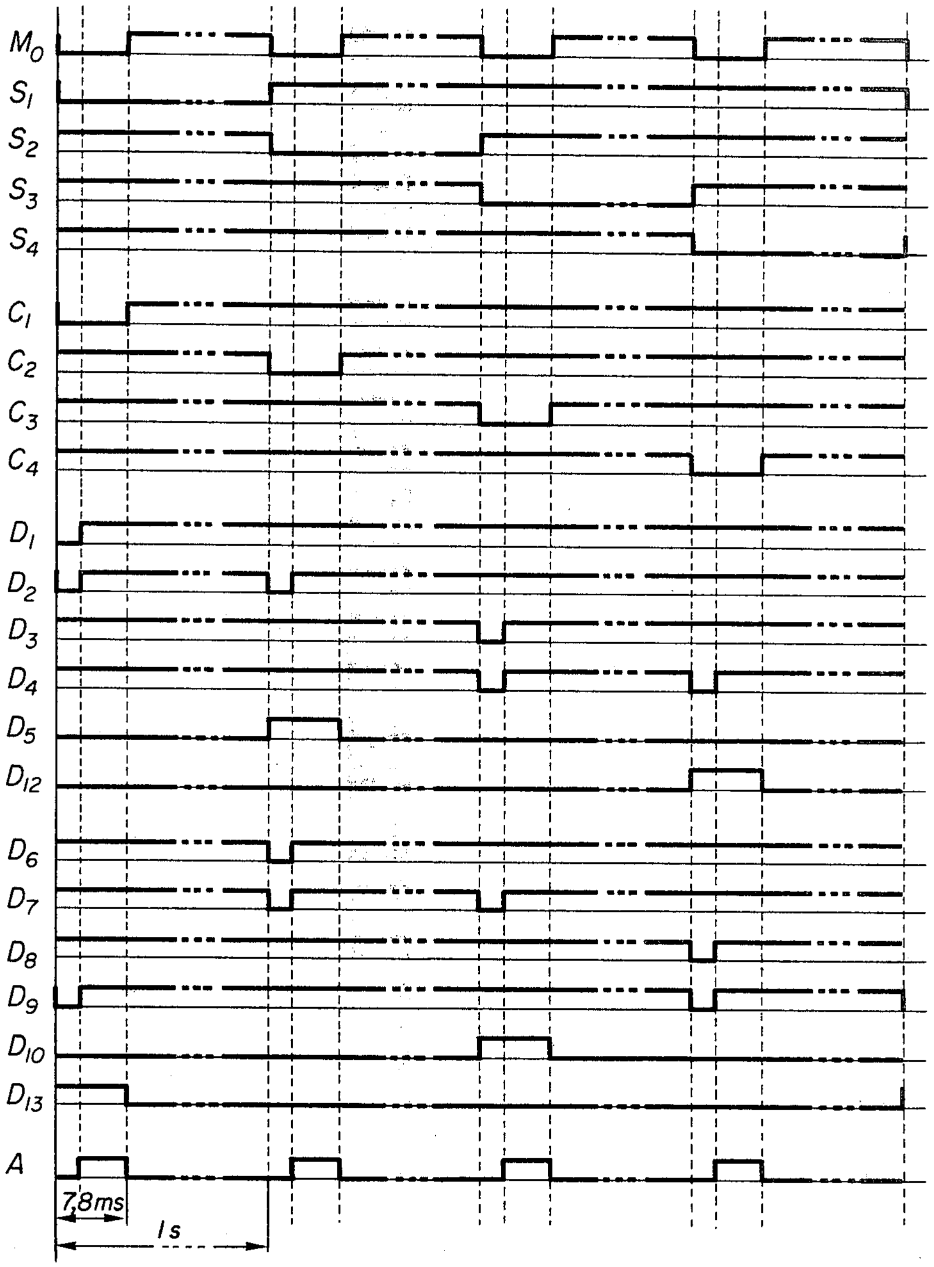
FIG. 6 is a diagram of the signals appearing in the circuit of FIG. 5.

A source of clock signals 22, formed for example by a Motorola MC14451 integrated circuit, provided with a quartz resonator, delivers calibrated unipolar pulses $M_0$ of a duration of 7.8 ms and a period of 1 s, in this example, to an input of a state sequence generator circuit 31. In the illustrated embodiment this state sequence generator circuit is a SANYO PMM 8713 integrated circuit, of which the outputs marked 10, 11, 12 and 13 respectively deliver signals $S_1$, $S_2$, $S_3$ and $S_4$, as represented in FIG. 6. These signals are respectively applied to an input of OR logic circuits 32, 33, 34 and 35 which receive, on a second input, clock signals $M_0$. The signals $C_1$, $C_2$, $C_3$ and $C_4$, respectively, thus appear at the output of these OR circuits, the form of these signals being represented in the corresponding lines of FIG. 6. The signals $C_1$ to $C_4$ are applied in the manner shown in FIG. 5 to the AND logic circuits 36, 37, 38, to OR logic circuits 39, 40, 41, 42, 43, 44, 45 and 46 and also to inverter circuits 47, 48, 49, 50. As shown in FIG. 5, certain of these circuits receive logic combinations of certain signals $C_1$ to $C_4$ formed in a preceding stage. On the other hand, it is also apparent from FIG. 5 that the circuits 39 to 46 receive at one input a signal A formed from the integrator 24, 25 in the manner later described.

Thus, signals $D_1$, $D_2$, $D_6$, $D_7$, $D_3$, $D_4$, $D_8$ and $D_9$, respectively, appear at the output of the logic circuits 39 to 46, the form of these signals being shown at the lines of like name in FIG. 6. These signals are respectively applied to the control electrodes of 8 transistors $M_1$, $M_2$, $M_6$, $M_7$, $M_3$, $M_4$, $M_8$ and $M_9$, which form part of the commutating or switching circuit mentioned in connection with FIG. 3. To this end, these transistors are connected in series, two by two, between a terminal V and the earth of an electric energy source 23, and the common point of connection of the conduction paths of each pair of transistors is connected to a respective end of the coils $b_1$ and $b_2$ representing the two phases of the motor. Thus, each coil can be fed by two transistors being brought into the conduction state by a current of desired sign from the energy source. For example, the simultaneous conduction of the transistors $M_1$ and $M_4$ produces a current through the coil $b_1$ in the direction V to earth. On the other hand, the simultaneous conduction of the transistors $M_2$ and $M_4$ short-circuits the coil $b_1$ through these transistors.

The output signals of the inverters 47 to 50, namely, $D_5$, $D_{10}$, $D_{12}$ and $D_{13}$, respectively, are applied to the respective control electrodes of transistors $M_5$, $M_{10}$, $M_{12}$ and $M_{13}$, also forming part of the switching circuit. The conduction paths of these transistors are connected in series and in pairs and their common points of connection are connected to an integrator circuit input 24,25. The other ends of the conduction paths of the transistors $M_5$, $M_{10}$, $M_{12}$ and $M_{13}$ are connected to the ends of the coils $b_1$ and $b_2$, as shown in FIG. 5. This makes possible the connection of one or other of the coils to the input of the integrator circuit in conformity with the programme determined by the arrangement of the described logic circuit.

The output of the integrator 24,25 is connected to an input of a differential amplifier 51, of which the other input receives an appropriate reference voltage REF. A signal A thus appears at the output of the circuit 51 when the output voltage of the integrator exceeds a predetermined value. The condenser 25 is connected in parallel with the conduction paths of a transistor $M_{11}$, of which the control electrode is connected by a line 28 to the clock signal source $M_0$. Thus, in this case, the integrator is set at zero in the interval between the clock signals $M_0$.

The control sequence of the motor, in two-phase operation, comprises four states. For each of these states, the procedure as regards supply and limitation of the duration of the supply of the driving coil takes place in the same manner. For example, let $\alpha_o$ be the starting point according to FIG. 4. The coil $b_1$ has applied thereto a current $i_1$ corresponding to the torque $Cni_1$, thereby making the transistors $M_1$ and $M_4$ conductors $M_2$ and $M_3$ being blocked. This results from the state of the control signals $D_1$ to $D_4$ of these transistors $M_1$ to $M_4$. The coil $b_2$ is branched on to the integrator for measuring the development of the flux $\Phi a2$, due particularly to the control of the transistors connected to this coil, the transistors $M_7$ and $M_{13}$ being conducting.

When the rotor turns, the potential at the output of the integrator, initially at zero, increases and, for a determined angular position, corresponding for example to half the supply voltage of the logic circuits, triggers the comparator 51. The appearance of the signal A at the output of the comparator has the effect of inverting the control levels of the transistors $M_1$ and $M_2$ and the coil $b_1$ is thus disconnected from the source 23 and short-circuited through the transistors $M_4$ and $M_2$. The control level of the transistor $M_9$ is likewise inverted, which also short-circuits the coil $b_2$ through the transistors $M_7$ and $M_9$. At the end of the pulse $M_0$, the integrator is reset to zero by $M_{11}$, as previously mentioned.

The driving pulse is thus limited in its duration by the appearance of a signal A before the end of the calibrated pulse $M_0$, which represents the maximum time necessary for bringing the rotor into the following equilibrium position in the direction of its rotation. The appearance of the signal A corresponds to an intermediate position of the rotor, from which it reaches the said position of equilibrium without there being any need for current in the supplied phase.

The short-circuiting of the coil $b_1$ enables the self-inductance energy to discharge, which is thus recovered, and then permits the braking of the movement of the rotor. Nevertheless, on approaching the equilibrium position $\alpha_o+\pi/2N$, the braking action through the coil $b_1$ disappears and it is essentially the short-circuit of the coil $b_2$ which produces a braking torque. In the operational procedure which is described here, it is thus not expected that the rotor is stabilised in $\alpha_o+\pi/2N$ by the torque $Cni_1$ for interrupting the current $i_1$. It is necessary for the locking torque $C_{o4}$ of strictly magnetic origin to be of sufficiently large amplitude and the speed of the rotor to be sufficiently small for the rotor to be stopped in the vicinity of this equilibrium position. A high precision in this final position is not necessary because, as mentioned above, the starting torque of the following step, given by $Cni_2$, has little dependence on this position, as likewise the flux $\Phi a_1$. The amplitude of $C_{04}$ may thus remain relatively small, since the angular errors due to the small inflexibility resulting from this torque and from the effect of the frictional torque of the mechanism are acceptable. For the following step, the coil $b_2$ is fed by the electric energy source 23 and the coil $b_1$ serves as stopping coil. The signals in FIG. 5 show that the states of the transistors $M_6$ and $M_7$ are reversed, permitting the passage of the current into $b_2$ by way of $M_6$ and $M_9$. The states of $M_2$ and $M_5$ are also being reversed and thus the terminal of B1, which is coupled to $M_5$, is connected to the integrator, while the other terminal of coil B1 remains connected to ground and at the same time M11 resets in operation the integrator with a zero initial value at its output.

Figure 4:
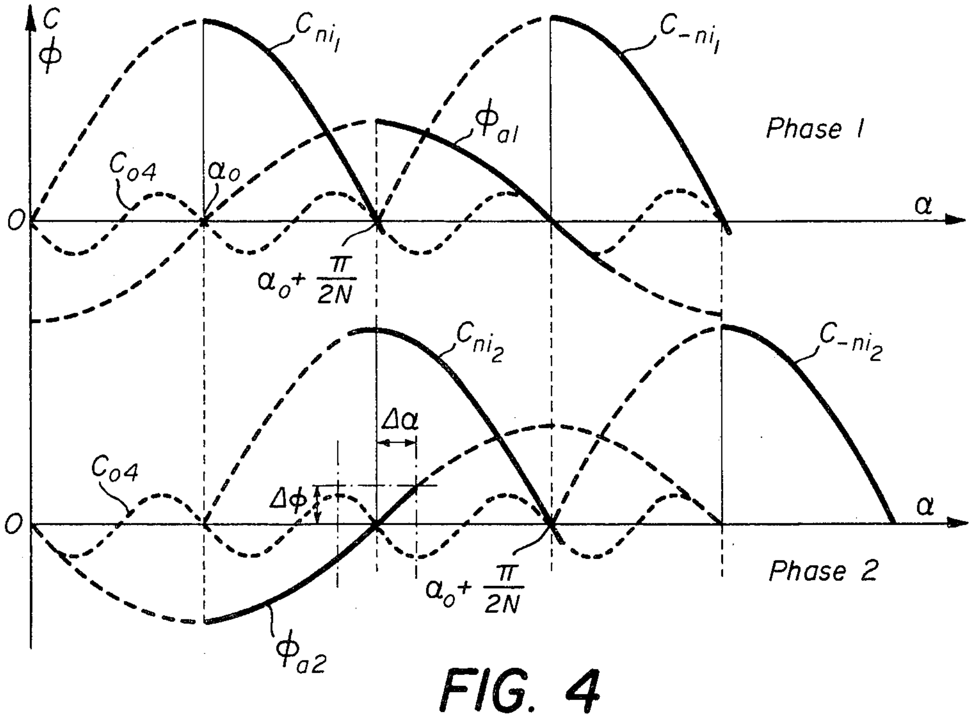
FIG. 4 is a diagram of the fluxes and torques, as a function of the angular position of the rotor, appearing with two-phase functioning of the motor.

For the third step of the cycle, a current is caused to pass into $b_1$ supplying the torque $C-ni1$, according to FIG. 4, and the vibrations of the decreasing flux $\Phi a_2$ induced in the coil $b_2$ are integrated. The states of $M_3$ and $M_4$ are reversed and the current thus passes into the coil $b_1$ by way of $M_2$ and $M_3$. The transistors $M_7$ and $M_{10}$ change state, so that the end of the coil $b_2$ connected to these transistors is connected to the integrator.

For the fourth step and final state of the cycle, a current is caused to pass into the coil $b_2$, which supplies a torque $C-ni2$ and the variations of the increasing flux $\Phi a_1$ intercepted by the coil $b_1$ are integrated. The states of $M_8$ and $M_9$ are inverted, so that the current passes into $b_2$ by way of $M_7$ and $M_8$. The end of the coil $b_1$ connected to the transistors $M_4$ and $M_{12}$ is connected to the integrator by change of state of these transistors.

Figure 7:
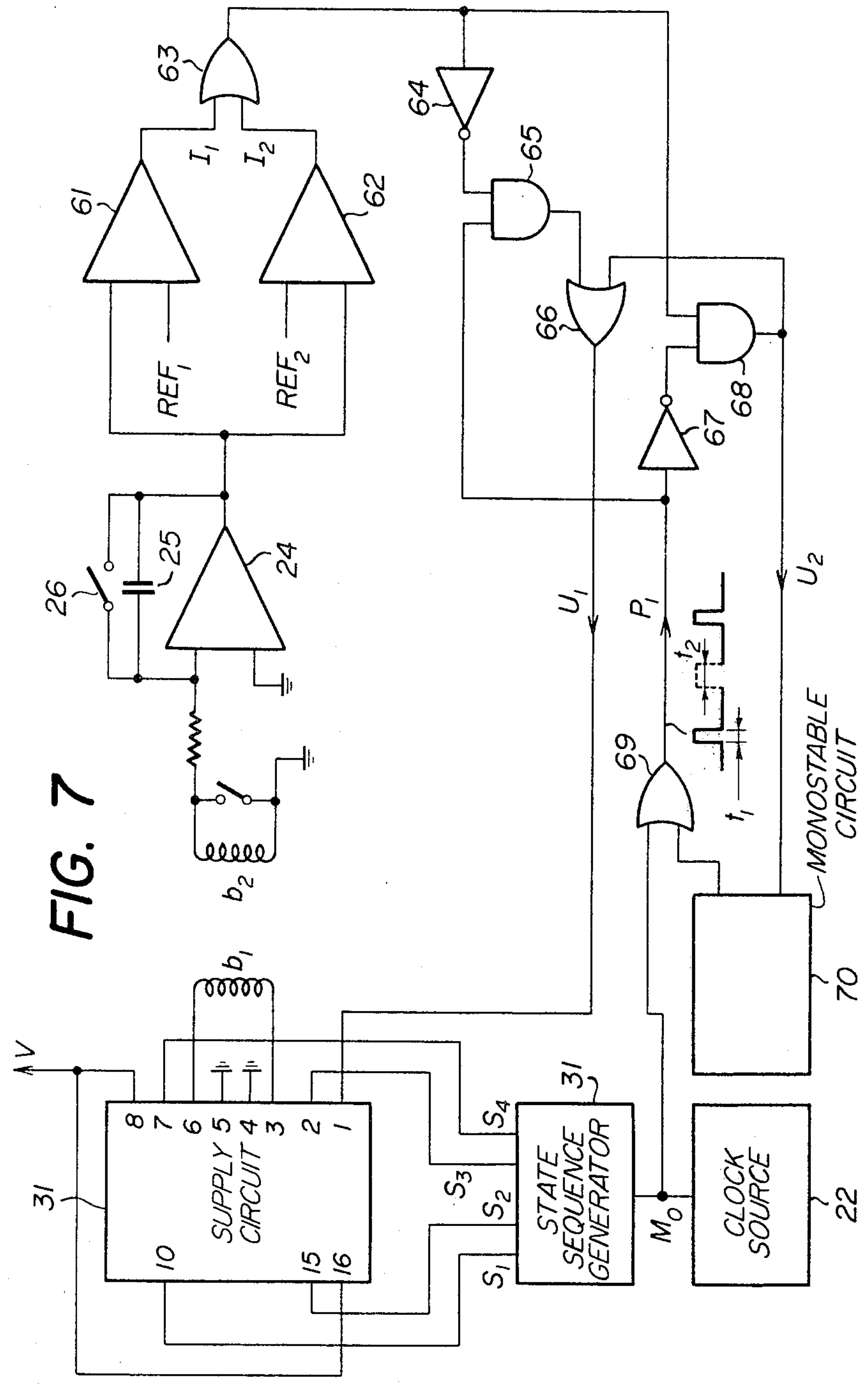
FIG. 7 is a simplified diagram of a control device, illustrating the treatment of a disturbance in the functioning of the motor.

FIG. 7 shows the simplified diagram of a control device by which it is possible to compensate for external disturbances on the rotor, but in which the permutation circuit of the coils $b_1$ and $b_2$ and the control circuit of the integrator have been intentionally omitted.

The source 22 of clock signals $M_0$ once again supplies the four-state sequence generator circuit 31, providing the signals $S_1$ to $S_4$ at its output. These signals control a supply circuit 31' (for example an SGS circuit, type L293), connected to the electric energy source and to which is momentarily connected, for example, the coil $b_1$, serving as driving coil.

The coil $b_2$ is connected at the same moment to the input of the integrator circuit 24,25, of which the output is connected in parallel with the positive and negative inputs of two similar operational amplifiers 61 and 62. The integrator 24 utilises, for example, a FAIRCHILD ICL 7611 integrated circuit and the operational amplifiers 61 and 62 can be ICL 7612 circuits. The second inputs of these amplifiers are connected to the respective reference voltage sources $REF_1$ and $REF_2$. The outputs of the circuits 61 and 62, at which appear the signals $I_1$ and $I_2$, respectively, are connected to the inputs of an OR logic circuit represented by 63, of which the output in its turn is connected, as shown in FIG. 7, to an inverter 64 and to one input of an AND logic circuit 68.

In addition, the circuit of FIG. 7 comprises a monostable circuit 70, for example, a SEFCOSEM SFC 4121E integrated circuit, which provides control pulses of fixed duration $t_2$ to one input of an OR logic circuit indicated by 69, the other input of this circuit receiving pulses $M_0$ of duration $t_1$. Appearing at the output of the circuit 69 is a signal $P_1$, which is applied by means of an inverter 67 to the second input of the logic circuit 68 and also directly to an input of an AND logic circuit 65, of which the other input is connected to the output of the inverter 64. Occurring at the output of the circuit 68 is a signal $U_2$, which is applied firstly to the triggering input of the circuit 70 and secondly to an input of an OR logic circuit, indicated at 66 and of which the other input is connected to the output of the logic circuit 65. The output signal $U_1$ of the circuit 66 is applied to a control input of the circuit 31', so as to control the passage of a driving current corresponding to this signal $U_1$ into the coil $b_1$.

The following truth table indicates the states of the different signals appearing at certain points of FIG. 7 and illustrates the functioning of the circuit.

| | $P_1$ | $I_1$ | $I_2$ | $U_1$ | $U_2$ |
|---|---|---|---|---|---|
| REST | 0 | 0 | 0 | 0 | 0 |
| START OF IMPULSE $M_0$ | 1 | 0 | 0 | 1 | 0 |
| INTERRUPTION OF CURRENT BY THE INTEGRATOR | 1 | 1 or 0 | 0 1 | 0 | 0 |
| AFTER THE PULSE $M_0$ | 0 | 0 | 0 | 0 | 0 |
| PRESENCE OF A STRONG DISTURBANCE TRIGGERING OF $t_2$ | 0 | 1 or 0 | 0 1 | 1 | 1 |
| RESETTING AT Ø OF THE INTEGRATOR AND RE-SUPPLY OF THE COIL $b_1$ | 1 | 0 | 0 | 1 | 0 |

With the occurrence of a clock signal $M_0$, the output $S_1$ triggers the circulation of the driving current in the coil $b_1$. The switch 26 is closed by a circuit, which is not shown and for a very short duration, which is of the order of 100 μs, and is then re-opened. The rotor is practically not further displaced during this time.

The output signal of the integrator increases when the rotor is directed from the initial position $\alpha_o$ according to FIG. 4 towards the equilibrium position $\alpha_o+\pi/2N$; when the signal reaches the corresponding reference level in an intermediate position of the rotor, a logic state 1 appears at the output of the corresponding comparator 61 or 62. The signal $U_1$ thus passes to the zero level, and it is this which interrupts the current in the coil $b_1$.

Should it happen that, for an undetermined reason, the integrator has still not controlled the stopping of the current at the conclusion of the impulse $M_0$ of duration $t_1$, the level $P_1$ passes to zero and the current is interrupted. The integrator is reset at zero by means of a circuit (not shown) as soon as the current is broken and it is only opened after the elapse of a time of, for example, 20 ms, which is sufficient to permit the rotor to be completely stopped. The short-circuiting of the coil $b_2$ may be of assistance in this function.

When the integrator is once again opened, it is ready to detect an outside disturbance. The rotor is disposed in the position $\alpha_o+\pi/2N$ and the zero potential at the output of the integrator corresponds to the passage through zero of the curve Φa2 of FIG. 4. It is the position in which a variation of angular position generates the greatest variation in flux. As soon as an outside disturbance, such as a linear or angular shock, displaces the rotor by a value such that the output signal of the integrator has a level sufficient for triggering one or other of the comparators 61 or 62, the table shows that the signals $U_1$ and $U_2$ are equal to 1, which triggers a pulse $t_2$ in the coil $b_1$. This pulse is of the same sign as the preceding pulse and restores the rotor to the position $\alpha_o+\pi/2N$. The switch 26 is reset at zero and kept at zero during the new pulse, then it is again opened for detecting a possible further disturbance.

In accordance with one embodiment of the invention, the device is used for checking that the rotor has effectively reached the following position of equilibrium after its initiation. In that case, the device is devised in order to compare the output level of the integrator with a reference level corresponding to the value of the flux when the rotor has reached a position close to the equilibrium position. If the flux is weaker, the rotor is returned to its initial position and the comparator consequently triggers a pulse of the same sign in the same coil, this pulse having a fixed duration, such as $t_2$, permitting the rotor to pass beyond the step. If the flux is stronger, the motor has made a double step on its initiation and the device thus equally controls the triggering of a driving pulse of a duration $t_2$.

The present device thus makes it possible to effect the servo-control of the position of the rotor, taking into account the possible different disturbances of the movement, while limiting, in the normal case, the duration of the driving pulses to a minimum by a detection of a value which depends solely on the position of the rotor.

I claim:

1. A control device for a two-phase stepper motor of the type comprising a permanent magnet rotor and at least two separate magnetic stator circuits each coupled with at least one electric coil, this control device comprising an electric power source, a source of clock signals, a logic control circuit including a state-sequence generator, a level comparator and logic circuitry, the control device further comprising a resettable integrator circuit and a controllable switching circuit, said switching circuit being adapted to connect said electric coil or coils associated with either one of the motor phases to the electric power source or to the input of said integrator circuit, in accordance with control signals delivered to the switching circuit by said logic control circuit, said integrator circuit having its output connected to one input of said level comparator the other input of which is connected to a predetermined position reference voltage, said state sequence generator being connected by its input to said source of clock signals and said logic circuitry being connected to combine outputs of said state sequence generator, of said clock-signal source and of said level comparator and to provide said control signals for the switching circuit to the effect that for rotation of the motor in a given direction driving pulses are alternatively delivered to the coils associated with either phase of the motor, that at least one of the coils associated with the phase not supplied by a driving pulse is temporarily connected to the integrator circuit and that each driving pulse is cut-off when the rotor reaches a predetermined position between two consecutive stable equilibrium positions.

2. A control device in accordance with claim 1, wherein the logic control circuit is adapted for resetting the integrator circuit to zero when the rotor reaches a stable equilibrium position, for reactivating said integrator circuit immediately thereafter and for delivering a new current pulse to the previously supplied coil or coils in response to an output of said integrator circuit, for maintaining the rotor in said stable equilibrium position.

* * * * *